US012562297B2

(12) United States Patent
Katayama et al.

(10) Patent No.: US 12,562,297 B2
(45) Date of Patent: Feb. 24, 2026

(54) R-T-B-BASED RARE EARTH MAGNET PARTICLES, PROCESS FOR PRODUCING THE R-T-B-BASED RARE EARTH MAGNET PARTICLES, AND BONDED MAGNET

(71) Applicant: TODA KOGYO CORP., Hiroshima (JP)

(72) Inventors: Nobuhiro Katayama, Otake-shi (JP); Hirofumi Kawasaki, Otake-shi (JP); Koichiro Morimoto, Otake-shi (JP)

(73) Assignee: TODA KOGYO CORP., Hiroshima (JP)

( * ) Notice: Subject to any disclaimer, the term of this patent is extended or adjusted under 35 U.S.C. 154(b) by 701 days.

(21) Appl. No.: 17/399,333

(22) Filed: Aug. 11, 2021

(65) Prior Publication Data

US 2021/0375513 A1 Dec. 2, 2021

Related U.S. Application Data

(62) Division of application No. 14/205,894, filed on Mar. 12, 2014, now Pat. No. 11,120,932.

(30) Foreign Application Priority Data

Mar. 13, 2013 (JP) .................................. 2013-50830

(51) Int. Cl.

| | |
|---|---|
| ***H01F 1/057*** | (2006.01) |
| ***B22F 9/04*** | (2006.01) |
| ***C21D 6/00*** | (2006.01) |
| ***C22C 33/02*** | (2006.01) |
| ***C22C 38/00*** | (2006.01) |
| ***C22C 38/06*** | (2006.01) |
| ***C22C 38/10*** | (2006.01) |
| ***C22C 38/14*** | (2006.01) |

(52) U.S. Cl.

CPC .............. *H01F 1/0573* (2013.01); *B22F 9/04* (2013.01); *C21D 6/00* (2013.01); *C22C 33/0278* (2013.01); *C22C 38/002* (2013.01); *C22C 38/005* (2013.01); *C22C 38/06* (2013.01); *C22C 38/10* (2013.01); *C22C 38/14* (2013.01); *B22F 2998/10* (2013.01); *B22F 2999/00* (2013.01); *C21D 2201/00* (2013.01); *C22C 2202/02* (2013.01); *H01F 1/0578* (2013.01)

(58) Field of Classification Search

None

See application file for complete search history.

(56) References Cited

U.S. PATENT DOCUMENTS

2005/0028892 A1 2/2005 Sasaki
2006/0048855 A1* 3/2006 Honkura ............. H01F 41/0293 148/105
2006/0292395 A1 12/2006 Mori et al.
2007/0266822 A1 11/2007 Sasaki
2009/0123774 A1 5/2009 Nishiuchi et al.
2010/0003156 A1 1/2010 Suzuki et al.
2012/0032764 A1 2/2012 Kuniyoshi
2013/0009736 A1 1/2013 Honkura et al.
2013/0068992 A1 3/2013 Hono et al.

FOREIGN PATENT DOCUMENTS

| | | |
|---|---|---|
| JP | 2010-114200 | 5/2010 |
| JP | 2010-263172 | 11/2010 |
| WO | WO 03/052778 | 6/2003 |
| WO | WO 2011/070847 | 6/2011 |
| WO | 2011/145674 | 11/2011 |

OTHER PUBLICATIONS

Extended Search Report of corresponding European App. No. 14159241.0 (dated Nov. 14, 2014).

International Preliminary Report on Patentability issued in PCT/JP2012/072060 dated Mar. 20, 2014.

Extended European Search Report issued in connection with European Patent Application No. 12829301.6, dated Jul. 2, 2015.

Grieb et al., "Replacement of Nd by an Intermetallic phase in the intergranular region of Fe—Nd—B sintered magnets," pp. 6354-6356, Journal of Applied Physics, vol. 70, No. 10, Nov. 15, 1991.

International Search Report issued in PCT/JP2012/072060 dated Dec. 4, 2012.

Knoch et al., "Upgraded Nd—Fe—B-AD (AD=Al, Ga) Magnets: Wettability and Microstructure," pp. 1951-1953, IEEE Transactions on Magnetics, vol. 26, Issue 5, Sep. 1990.

Sepehri-Amin et al., "Coercivity enhancement of hydrogenation-disproportionation-desorption-recombination processed Nd—Fe—B powders by the diffusion of Nd—Cu eutectic alloys," pp. 1124-1127, vol. 63, Scripta Materialia, 2010.

(Continued)

*Primary Examiner* — Nicholas A Wang

(74) *Attorney, Agent, or Firm* — NIXON & VANDERHYE, PC

(57) ABSTRACT

An object of the present invention is to enhance a coercive force of magnetic particles by promoting formation of a continuous R-rich grain boundary phase in a crystal grain boundary of a magnetic phase of the particles, and to thereby obtain R-T-B-based rare earth magnet particles further having a high residual magnetic flux density. The present invention relates to production of R-T-B-based rare earth magnet particles capable of exhibiting a high coercive force even when a content of Al therein is reduced, and a high residual magnetic flux density, in which formation of an R-rich grain boundary phase therein can be promoted by heat-treating Al-containing R-T-B-based rare earth magnet particles obtained by HDDR treatment in vacuum or in an Ar atmosphere at a temperature of not lower than 670° C. and not higher than 820° C. for a period of not less than 30 min and not more than 300 min.

5 Claims, No Drawings

(56) References Cited

OTHER PUBLICATIONS

Office Action issued in U.S. Appl. No. 14/342,930, dated Sep. 26, 2019.
Office Action issued in U.S. Appl. No. 14/342,930, dated Jul. 16, 2018.

* cited by examiner

R-T-B-BASED RARE EARTH MAGNET PARTICLES, PROCESS FOR PRODUCING THE R-T-B-BASED RARE EARTH MAGNET PARTICLES, AND BONDED MAGNET

CROSS-REFERENCE TO RELATED APPLICATIONS

This application is a divisional of U.S. application Ser. No. 14/205,894, filed Mar. 12, 2014, which claims priority to Japanese Patent Application No. 2013-50830 filed Mar. 13, 2013, the entire contents of each of which are incorporated herein by reference.

BACKGROUND OF THE INVENTION

The present invention relates to R-T-B-based rare earth magnet particles, and a process for producing the R-T-B-based rare earth magnet particles.

R-T-B-based rare earth magnet particles (wherein R represents a rare earth element, T represents a transition metal including Fe as an essential element, and B represents boron) have excellent magnetic properties and have been extensively used in the industrial applications such as magnets for various motors employed in automobiles, etc. However, the R-T-B-based rare earth magnet particles tend to suffer from a large change in magnetic properties depending upon a temperature, and therefore tends to be rapidly deteriorated in coercive force under a high-temperature condition.

It is conventionally known that the R-T-B-based rare earth magnet particles are produced by subjecting a raw material alloy to HDDR treatment (hydrogenation-decomposition-desorption-recombination).

Hitherto, in the case where the R-T-B-based rare earth magnet particles are produced by HDDR treatment, various elements have been incorporated into the magnet particles to promote formation of a continuous R-rich grain boundary phase in a crystal grain boundary of a magnetic phase of the magnet particles in order to enhance a coercive force of the magnet particles. However, if the amount of elements constituting no magnetic phase is increased, magnetization of the grain boundary phase tends to be lowered, thereby inducing deterioration in residual magnetic flux density of the magnet particles.

In Japanese Patent. Application Laid-Open (KOKAT) No. 9-165601(1997), it is described that an R-T-B-based alloy to which a trace amount of Dy is added is subjected to HDDR treatment to obtain magnet particles having an excellent coercive force.

In Japanese Patent Application Laid-Open (KOKAI) No. 2002-09610, it is described that diffusing particles comprising hydrogenated Dy or the like are mixed in $RFeBR_x$ particles, and the resulting mixed particles are subjected to diffusion heat treatment step and dehydrogenation step to thereby obtain magnet particles having an excellent coercive force in which Dy or the like is diffused on a surface of the parties and inside thereof.

In Japanese Patent Application Laid-Open (KOKAI) No. 2011-49441, it is described that Zn-containing particles are mixed in R—Fe—B-based magnet particles produced by HDDR treatment, and the resulting mixed particles are subjected to mixing and pulverization, diffusion heat treatment and aging heat treatment to thereby obtain magnet particles having an excellent coercive force in which Zn is diffused in a grain boundary thereof.

In addition, in international Patent Application Laid-Open WO 2011/145674, it is described that Nd—Cu particles are mixed in R—Fe—B-based magnet particles produced by HDDR treatment, and the resulting mixed particles are subjected to heat treatment and diffusion to diffuse Nd—Cu in a grain boundary thereof as a main phase to obtain magnet particles having an excellent coercive force.

SUMMARY OF THE INVENTION

Hitherto, various studies have been made to enhance a coercive force of magnet particles by a method of adding Dy to a raw material alloy or a method of diffusing additive elements in the raw material alloy during HDDR step or after HDDR step. However, if the amount of elements constituting no magnetic phase is increased, magnetization of the grain boundary phase tends to be lowered, thereby inducing deterioration in residual magnetic flux density of the magnet particles.

An object of the present invention is to obtain R-T-B-based rare earth magnet particles having a high residual magnetic flux density by suppressing the amount of elements added thereto which constitute no magnetic phase. Another object of the present invention is to produce R-T-B-based rare earth magnet particles having excellent coercive force and residual magnetic flux density in which deterioration in capability of forming an R-rich grain boundary phase owing to suppression of the amount of elements added for the purpose of promoting formation of the R-rich phase is compensated by heat treatment conducted after the HDDR treatment.

That according to the present invention, there are provided R-T-B-based rare earth magnet particles comprising R (wherein R represents at least one rare earth element including Y), T (wherein T represents Fe, or Fe and Co), B (wherein B represents boron) and Al (wherein Al represents aluminum), and having an average composition comprising R in an amount of not less than 12.5 atom % and not more than 14.3 atom %, B in an amount of not less than 4.5 atom % and not more than 7.5 atom % and Al in an amount of less than 1.0 atoms, in which the R-T-B-based rare earth magnet particles comprise crystal grains comprising an $R_2T_{14}B$ magnetic phase, and a grain boundary phase; and the grain boundary phase comprises R (wherein R represents at least one rare earth element including Y), T (wherein T represents Fe, or Fe and Co), B (wherein B represents boron) and Al (wherein Al represents aluminum), and has a composition comprising R in an amount of not less than 13.5 atom % and not more than 30.0 atom % and Al in an amount of not more than 1.5 atom % (Invention 1).

Also, according to the present invention, there are provided the R-T-B-based rare earth magnet particles as described in the above Invention 1, wherein the R-T-B-based rare earth magnet particles comprise Ga and Zr, and have an average composition comprising Co in an amount of not more than 10.0 atom %, Ga in an amount of not less than 0.1 atom % and not more than 1.0 atom % and Zr in an amount of not less than 0.05 atom.% and not more than 0.15 atom % (Invention 2).

In addition, according to the present invention, there is provided a process for producing R-T-B-based rare earth magnet particles, comprising the steps of:

subjecting a raw material alloy comprising R (wherein R represents at least one rare earth element including Y), T (wherein T represents Fe, or Fe and Co), B (wherein B represents boron) and Al (wherein Al represents aluminum)

to HDDR treatment to obtain Al-containing R-T-B-based rare earth magnet particles having an Al content of less than 1.5 atom %; and heat-treating the Al-containing R-T-B-based rare earth magnet particles in vacuum or in an Ar atmosphere at a temperature of not lower than 670° C. and not higher than 820° C. for a period of not less than 30 min and not more than 300 min (Invention 3).

Also, according to the present invention, there is provided the process for producing R-T-B-based rare earth magnet particles as described in the above Invention 3, wherein the raw material alloy has a composition comprising R in an amount of not less than 12.5 atom % and not more than 14.3 atom %, B in an amount of not less than 4.5 atom % and not more than 7.5 atom %, and Al in an amount of less than 1.5 atom % (Invention 4).

Also, according to the present invention, there is provided the process for producing R-T-B-based rare earth magnet particles as described in the above Invention 3 or 4, wherein the raw material alloy comprises Ga and Zr, and has a composition comprising Co in an amount of not more than 10.0 atom %, Ga in an amount of not less than 0.1 atom % and not more than 1.0 atom % and Zr in an amount of not less than 0.05 atom % and not more than 0.15 atom % (Invention 5).

Further, according to the present invention, there are provided R-T-B-based rare earth magnet particles which are obtained by the process for producing R-T-B-based rare earth magnet particles as described in any one of the above Inventions 3 to 5 (Invention 6).

Furthermore, according to the present invention, there is provided a bonded magnet using the R-T-B-based rare earth magnet particles as described in the above Invention 1, 2 or 6 (Invention 7).

The R-T-B-based rare earth magnet particles according to the present invention can exhibit excellent coercive force and residual magnetic flux density and therefore can be suitably used as magnetic particles for bonded magnets.

Since the raw material alloy used in the present invention comprises Al as an additive element for promoting formation of an R-rich grain boundary phase, it is possible to produce R-T-B-based rare earth magnet particles having an excellent coercive force even without conducting a complicated step for diffusing R in the grain boundary phase.

In addition, according to the present invention, since the amount of elements added thereto which constitute no magnetic phase can be suppressed, it is possible to obtain R-T-B-based rare earth magnet particles having a high residual magnetic flux density. Further, according to the present invention, since deterioration in capability of forming an R-rich grain boundary phase owing to suppression of the amount of additive elements added for promoting formation of the R-rich grain boundary phase is compensated by heat treatment conducted after the HDDR treatment, it is possible to produce R-T-B-based rare earth magnet particles having excellent coercive force and residual magnetic flux density.

DETAILED DESCRIPTION OF THE INVENTION

First, the R-T-B-based rare earth magnet particles according to the present invention are described.

The R-T-B-based rare earth magnet particles according to the present invention comprise R (wherein R represents at least one rare earth element including Y), T (wherein T represents Fe, or Fe and Co), B (wherein B represents boron) and Al (wherein Al represents aluminum).

As the rare earth element R constituting the R-T-B-based rare earth magnet particles according to the present invention, there may be used at least one element selected from the group consisting of Y, La, Ce, Pr, Nd, Pm, Sm, Eu, Gd, Tb, Dy, Ho, Er, Tm, Yb and Lu. Among these rare earth elements, from the standpoint of costs and magnetic properties, Nd is preferably used. The R-T-B-based rare earth magnet particles have an average composition comprising R in an amount of not less than 12.5 atom % and not more than 14.3 atom %. When the content of R in the average composition is less than 12.5 atom %, the content of R present in the grain boundary phase tends to be not more than 13.5 atom %, so that it is not possible to attain the effect of sufficiently enhancing a coercive force of the resulting magnet particles. When the content of R in the average composition is more than 14.3 atom %, the content of a non-magnetic phase in the grain boundary phase tends to be increased, so that the resulting magnet particles tends to be deteriorated in residual magnetic flux density. The content of R in the average composition of the magnet particles is preferably not less than 12.8 atom % and not more than 14.0 atom %.

The element T constituting the R-T-B-based rare earth magnet particles according to the present invention is Fe, or Fe and Co. The content of the element T in the average composition of the magnet particles is the balance of the composition of the magnet particles except for the other elements constituting the magnet particles. In addition, when Co is added as an element with which Fe is to be substituted, it is possible to raise a Curie temperature of the magnet particles. However, the addition of Co to the magnet particles tends to induce deterioration in residual flux density of the resulting magnet particles. Therefore, the content of Co in the average composition of the magnet particles is preferably controlled to not more than 10.0 atom %, and more preferably not less than 2.0 atom % and not more than 8.0 atom %.

The content of B in the average composition of the R-T-B-based rare earth magnet particles according to the present invention is not less than 4.5 atom % and not more than 7.5 atom %. When the content of B in the average composition of the magnet particles is less than 4.5 atom %, an $R_2T_{17}$ phase and the like tend to be precipitated, so that the resulting magnet particles tend to be deteriorated in magnetic properties. When the content of B in the average composition of the magnet particles is more than 7.5 atom %, the resulting magnet particles tend to exhibit a low residual magnetic flux density. The content of B in the average composition of the magnet particles is preferably not less than 5.0 atom % and not more than 7.0 atom %.

The content of Al in the average composition of the R-T-B-based rare earth magnet particles according to the present invention is less than 1.0 atom %. In the present invention, it is required that the R-T-B-based rare earth magnet particles comprise Al in an amount of more than 0 atom % because it is considered that Al has the effect of uniformly diffusing a surplus amount of R in a grain boundary of the R-T-B-based rare earth magnet particles. In order to rapidly diffuse R in the grain boundary, the content of Al in the average composition of the magnet particles is preferably not less than 0.05 atom %. On the other hand, when the content of Al in the average composition of the magnet particles is increased, the content of a non-magnetic phase in the magnet particles also tends to be increased so that the resulting magnet particles tend to be deteriorated in residual magnetic flux density. For this reason, it preferred that the content of Al in the average composition of the magnet particles small. When the content of Al in the average composition of the magnet particles is less than 1.0 atom %, the resulting magnet particles preferably exhibit a high residual magnetic flux density. The content of Al in the average composition of the magnet particles is more preferably not less than 0.07 atom % and not more than 0.8 atom %.

In addition, the R-T-B-based rare earth magnet particles according to the present invention preferably comprise Ga and Zr. The content of Ga in the average composition of the magnet particles is preferably not less than 0.1 atom % and not more than 1.0 atom %. When the content of Ga in the average composition of the magnet particles is less than 0.1 atom %, the effect of enhancing a coercive force of the resulting magnet particles tends to be low. When the content of Ga in the average composition of the magnet particles is more than 1.0 atom %, the resulting magnet particles tend to be deteriorated in residual magnetic flux density. Also, the content of Zr in the average composition of the magnet particles is preferably not less than 0.05 atom % and not more than 0.15 atom %. When the content of Zr in the average composition of the magnet particles is less than 0.05 atom %, the effect of enhancing a coercive force of the resulting magnet particles tends to be low. When the content of Zr in the average composition of the magnet particles is more than 0.15 atom %, the resulting magnet particles tend to be deteriorated in residual magnetic flux density.

Further, the R-T-B-based rare earth magnet particles according to the present invention may also comprise, in addition to the above-mentioned elements, at least one element selected from the group consisting of Ti, V, Nb, Si, Cr, Mn, Zn, Mo, Hf, W, Ta and Sn. When adding these elements to the magnet particles, it is possible to enhance magnetic properties of the resulting R-T-B-based rare earth magnet particles. The total content of these elements in the magnet particles is preferably not more than 2.0 atom %, and more preferably not more than 1.0 atom %. When the total content of these elements in the magnet particles is more than 2.0 atom %, the resulting magnet particles tend to be deteriorated in residual magnetic flux density.

The R-T-B-based rare earth magnet particles according to the present invention comprise crystal grains comprising an $R_2T_{74}B$ magnetic phase, and a grain boundary phase. In the R-T-B-based rare earth magnet particles according to the present invention, a continuous grain boundary phase is present in an interface between the crystal grains. Therefore, it is considered that since a magnetic bond between the crystal grains can be weakened, the resulting magnet particles can exhibit a high coercive force.

The grain boundary phase of the R-T-B-based rare earth magnet particles according to the present invention comprises R (wherein R represents at least one rare earth element including Y), T (wherein T represents Fe, or Fe and Co), B (wherein B represents boron) and Al (wherein Al represents aluminum).

The content of R in the composition of the grain boundary phase of the R-T-B-based rare earth magnet particles according to the present invention is not less than 13.5 atom % and not more than 30.0 atom %. When the content of R in the composition of the grain boundary phase is less than 13.5 atom %, it is not possible to attain a sufficient effect of enhancing a coercive force of the magnet particles. When the content of R in the composition of the grain boundary phase is more than 30.0 atom %, magnetization of a grain boundary of the magnet particles tends to be lowered, so that the resulting magnet particles tend to be deteriorated in residual magnetic flux density. The content of R in the composition of the grain boundary phase of the magnet particles is preferably not less than 20.0 atom % and not more than 30.0 atom %.

The content of Al in the composition of the grain boundary phase of the R-T-B-based rare earth magnet particles according to the present invention is not more than 1.5 atom %. In the present invention, it is required that the grain boundary phase of the R-T-B-based rare earth magnet particles comprises Al in an amount of more than 0 atom % because it is considered that Al has the effect of uniformly diffusing a surplus amount of R in a grain boundary of the R-T-B-based rare earth magnet particles. In order to more uniformly diffuse R in the grain boundary phase, the content of Al in the composition of the grain boundary phase is preferably not less than 0.05 atom %. On the other hand, when the content of Al in the composition of the grain boundary phase is more than 1.5 atom %, the content of a non-magnetic phase in the grain boundary phase tends to be increased so that the resulting magnet particles tend to be deteriorated in residual magnetic flux density. The content of Al in the composition of the grain boundary phase of the magnet particles is preferably not less than 0.06 atom % and not more than 1.2 atom %, and more preferably not less than 0.07 atom % and not more than 1.0 atom %.

The element T constituting the grain boundary phase of the R-T-B-based rare earth magnet particles according to the present invention is Fe, or Fe and Co. The content of the element T in the composition of the grain boundary phase of the magnet particles is the balance of the composition of the grain boundary phase of the magnet particles except for the other elements constituting the grain boundary phase.

Further, the grain boundary phase of the R-T-B-based rare earth magnet particles according to the present invention may also comprise, in addition to the above-mentioned elements, at least one element selected from the group consisting of Ga, Zr, Ti, V, Nb, Si, Cr, Mn, Zn, Mo, Hf, W, Ta and Sn.

In the following, the process for producing the R-T-B-based rare earth magnet particles according to the present invention is described in detail. In the process for producing the R-T-B-based rare earth magnet particles according to the present invention, the raw material alloy is subjected to HDDR treatment, and the resulting particles are heat-treated to obtain the R-T-B-based rare earth magnet particles.

First, the raw material alloy for the R-T-B-based rare earth magnet particles according to the present invention is explained.

The raw material alloy for the R-T-B-based rare earth magnet particles according to the present invention comprises R (wherein R represents at least one rare earth element including Y), T (wherein T represents Fe, or Fe and Co), B (wherein B represents boron) and Al (wherein Al represents aluminum).

As the rare earth element R constituting the raw material alloy for the R-T-B-based rare earth magnet particles according to the present invention, there may be used at least one element selected from the group consisting of Y, La, Ce, Pr, Nd, Pm, Sm, Eu, Gd, Tb, Dy, Ho, Er, Tm, Yb and Lu. Among these rare earth elements, from the standpoint of costs and magnetic properties, Nd is preferably used. The content of the element R in the raw material alloy is not less than 12.5 atom % and not more than 14.3 atom %. When the content of the element R in the raw material alloy is less than 12.5 atom %, a surplus amount of Nd diffused in the grain boundary tends to be reduced, so that it is not possible to attain a sufficient effect of enhancing a coercive force of the resulting magnet particles. When the content of the element R in the raw material alloy is more than 14.3 atom %, the raw material alloy tends to comprise a large amount a non-magnetic phase in a grain boundary phase thereof so that the resulting magnet particles tend to be deteriorated in residual magnetic flux density. The content of the element R in the raw material alloy is preferably not less than 12.8 atom % and not more than 14.0 atom %.

The element T constituting the raw material alloy for the R-T-B-based rare earth magnet particles according to the present invention is Fe, or Fe and Co. The content of the element T in the raw material alloy is the balance of the raw material alloy except for the other elements constituting the raw material alloy. In addition, when Co is added as an element with which Fe is to be substituted, possible to raise a Curie temperature of the raw material alloy. However, the addition of Co to the raw material alloy tends to induce deterioration in residual flux density of the resulting magnet particles. Therefore, the content of Co in the raw material alloy is preferably controlled to not more than 10.0 atom % and more preferably not less than 2.0 atom % and not more than 8.0 atom %.

The content of B in the raw material alloy for the R-T-B-based rare earth magnet particles according to the present invention is not less than 4.5 atom % and not more than 7.5 atom %. When the content of B in the raw material alloy is less than 4.5 atom %, an $R_2T_{17}$, phase and the like tend to be precipitated, so that the resulting magnet particles tend to be deteriorated in magnetic properties. When the content of B in the raw material alloy is more than 7.5 atom %, the resulting magnet particles tend to be deteriorated in residual magnetic flux density. The content of B in the raw material alloy is preferably not less than 5.0 atom % and not more than 7.0 atom %.

The content of Al in the raw material alloy of the R-T-B-based rare earth magnet particles according to the present invention is less than 1.5 atom %. In the present invention, it is required that the raw material alloy for the R-T-B-based rare earth magnet particles comprises Al in an amount of more than 0 atom % because it is considered that Al has the effect of uniformly diffusing a surplus amount of R in a grain boundary of the R-T-B-based rare earth magnet particles. In order to rapidly diffuse R in the grain boundary, the content of Al in the raw material alloy is preferably not less than 0.05 atom %. On the other hand, when the content of Al in the raw material alloy is increased, the content of a non-magnetic phase in the raw material alloy tends to be increased so that the resulting magnet particles tend to be deteriorated in residual magnetic flux density. For this reason, it is preferred that the content of Al in the raw material alloy is small. When the content of Al in the raw material alloy is not more than 1.0 atom %, the resulting magnet particles preferably exhibit a high residual magnetic flux density. The content of Al in the raw material alloy is more preferably not less than 0.07 atom % and not more than 0.8 atom %.

In addition, the raw material alloy for the R-T-B-based rare earth magnet particles according to the present invention preferably comprises Ga and Zr. The content of Ga in the raw material alloy is preferably not less than 0.1 atom % and not more than 1.0 atom %. When the content of Ga in the raw material alloy is less than 0.1 atom %, the effect of enhancing a coercive force of the resulting magnet particles tends to be low. When the content of Ga in the raw material alloy is more than 1.0 atom %, the resulting magnet particles tend to be deteriorated in residual magnetic flux density. In addition, the content of Zr in the raw material alloy is preferably not less than 0.05 atom % and not more than 0.15 atom %. When the content of Zr in the raw material alloy is less than 0.05 atom %, the effect of enhancing a coercive force of the resulting magnet particles tends to be low. When the content of Zr in the raw material alloy is more than 0.15 atom %, the resulting magnet particles tend to be deteriorated in residual magnetic flux density.

Further, the raw material alloy for the R-T-B-based rare earth magnet particles according to the present invention may also comprise, in addition to the above-mentioned elements, at least one element selected from the group consisting of Ti, V, Nb, Si, Cr, Mn, Zn, Mo, Hf, W, Ta and Sn. When adding these elements to the raw material alloy, it is possible to enhance magnetic properties of the resulting R-T-B-based rare earth magnet particles. The total content of these elements in the raw material alloy is preferably not more than 2.0 atom %, and more preferably not more than 1.0 atom %. When the total content of these elements in the raw material alloy is more than 2.0 atom %, the resulting magnet particles tend to be deteriorated in residual magnetic flux density or suffer from precipitation of the other phases.

(Production of Raw Material Alloy Particles)

As the raw material alloy for the R-T-B-based rare earth magnet particles, there may be used ingots produced by a book mold casting method or a centrifugal casting method, or strips produced by a strip casting method. These alloys tend to undergo segregation of their composition upon the casting, and therefore may be subjected to homogenization heat treatment for formation of the uniform composition before subjected to the HDDR treatment. The homogenization heat treatment may be carried out in a vacuum atmosphere or in an inert gas atmosphere at a temperature of preferably not lower than 950° C. and not higher than 1200° C. and more preferably not lower than 1000° C. and not higher than 1170° C. Next, the raw material alloy is subjected to coarse pulverization and fine pulverization to thereby produce raw material alloy particles for the HDDR treatment. The coarse pulverization may be carried out using a jaw crusher or the like. Thereafter, the resulting particles may be subjected to ordinary hydrogen absorbing pulverization and mechanical pulverization to thereby produce raw material alloy particles for the R-T-B-based rare earth magnet particles.

Next, the process for producing the R-T-B-based rare earth magnet particles using the above raw material alloy particles is explained.

(HDDR Treatment)

The HDDR treatment includes an HD step in which an R-T-B-based raw material alloy is subjected to hydrogenation to decompose the alloy into an α-Fe phase, an RH, phase and an $Fe_2B$ phase, and a DR step in which hydrogen is discharged under reduced pressure so that a reverse reaction of the above step is caused to produce $Nd_2Fe_{14}B$ from the above respective phases.

(HD Step)

The HD step is preferably carried out at a treating temperature of not lower than 700° C. and not higher than 870° C. The reason why the treating temperature is adjusted to not lower than 700° C. is that when the treating temperature is lower than 700° C., the reaction may fail to proceed. Also, the reason why the treating temperature is adjusted to not higher than 870° C. is that when the treating temperature is higher than 870° C., growth of crystal grans tends to be caused, so that the resulting magnet particles tend to be deteriorated in coercive force. The atmosphere used in the HD step is preferably a mixed gas atmosphere of a hydrogen gas having a hydrogen partial pressure of not less than 20 kPa and not more than 90 kPa, and an inert gas. The hydrogen partial pressure in the mixed gas atmosphere is more preferably not less than 40 kPa and not more than 80 kPa. The reason therefor is as follows. That is, when the hydrogen partial pressure is less than 20 kPa, the reaction tends to hardly proceed, whereas when the hydrogen partial pressure is more than 90 kPa, the reactivity tends to become excessively high, so that the resulting magnet particles tend to be deteriorated in magnetic properties. The treating time of the HD step is preferably not less than 30 min and not more than 10 hr, and more preferably not less than 1 hr and not more than 7 hr.

(DR Step)

The DR step is preferably conducted at a treating temperature of not lower than 800° C. and not higher than 900° C. The reason why the treating temperature is adjusted to not lower than 800° C. is that when the treating temperature is lower than 800° C., dehydrogenation tends to hardly proceed. Whereas, the reason why the treating temperature is adjusted to not higher than 900° C. is that when the treating temperature is higher than 900° C., the resulting particles tends to be deteriorated in coercive force owing to excessive growth of crystal grains therein. In the DR step, the vacuum degree is finally adjusted to not more than 1 Pa. The evaluation step of the DR step may be divided into a preliminary evacuation step and a complete evacuation step.

(DR Step: Preliminary Evacuation Step)

The preliminary evacuation step is preferably conducted at a treating temperature of not lower than 800° C. and not higher than 900° C. The reason why the treating temperature is adjusted to not lower than 800° C. is that when the treating temperature is lower than 800° C., dehydrogenation tends to hardly proceed. Whereas, the reason why the treating temperature is adjusted to not higher than 900° C. is that when the treating temperature is higher than 900° C., the resulting particles tends to be deteriorated in coercive force owing to excessive growth of crystal grains therein.

In the preliminary evacuation step, the vacuum degree is preferably adjusted to not less than 2.5 kPa and not more than 4.0 kPa. The reason therefor is that it is required to remove hydrogen from an $RH_2$ phase. When removing hydrogen from the $RH_2$ phase in the preliminary evacuation step, it is possible to obtain an RFeBH phase having a uniform crystal orientation. The treating time of the preliminary evacuation step is preferably not less than 30 min and not more than 180 min.

(DR Step: Complete Evacuation Step)

The complete evacuation step is preferably conducted at a treating temperature of not lower than 800° C. and not higher than 900° C. similarly to the preliminary evacuation step. The reason why the treating temperature is adjusted to not lower than 800° C. is that when the treating temperature is lower than 800° C., Nd—Al tends to remain unmelted and therefore diffusion of an Nd-rich phase into the grain boundary tends to become insufficient, so that the resulting magnet particles tend to be hardly improved in coercive force. On the other hand, the reason why the treating temperature is adjusted to not higher than 900° C. is that when the treating temperature is higher than 900° C., the resulting magnet particles tends to be deteriorated in coercive force owing to excessive growth of crystal grains therein.

In the complete evacuation step, the atmosphere used in the preliminary evacuation step is subjected to further evacuation until finally reaching a vacuum degree of not more than 1 Pa. In addition, the total treating time of the complete evacuation step is adjusted to not less than 30 min and not more than 150 min, in particular, the retention time at a vacuum degree of not less than 1 Pa and not more than 2000 Pa is preferably adjusted to not less than 10 min and not more than 140 min, and more preferably not less than 15 min and not more than 120 min. The vacuum degree in the complete evacuation step may be decreased either continuously or stepwise. When the total treating time of the complete evacuation step is not more than 30 min, the dehydrogenation tends to be incomplete, so that the resulting magnet particles tend to be deteriorated in coercive force. When the total treating time of the complete evacuation step is not less than 150 min, excessive growth of crystal grains tends to be caused, so that the resulting magnet particles tend to be deteriorated in coercive force.

When subjecting the raw material alloy to the above HDDR treatment, it is possible to obtain the R-T-B-based rare earth magnet particles. The thus obtained R-T-B-based rare earth magnet particles may be cooled after completion of the complete evacuation step. When subjecting the R-T-B-based rare earth magnet particles obtained after completion of the complete evacuation step to rapid cooling in Ar, it is possible to prevent growth of crystal grains of the magnet particles.

(Heat Treatment)

The R-T-B-based rare earth magnet particles are then subjected to heat treatment in a vacuum atmosphere or an Ar atmosphere. The heat treatment temperature is not lower than 670° C. and not higher than 820° C. When the heat treatment temperature is lower than 670° C., diffusion of the R-rich phase in the grain boundary tends to hardly proceed, so that the effect of enhancing a coercive force of the magnet particles tends to be lowered. When the heat treatment temperature is higher than 820° C., the effect of the heat treatment tends to be saturated, and crystal grains in the magnetic phase tend to become coarse, so that the resulting magnet particles tend to be deteriorated in coercive force. In addition, when the heat treatment is conducted at a temperature higher than the treating temperature of the DR step, there may occur such a problem that crystal grains in the magnetic phase tend to become coarse, so that the resulting magnet particles tend to be deteriorated in coercive force. Therefore, it is preferred that the heat treatment is conducted at a temperature lower than the treating temperature of the DR step. The heat treatment temperature is preferably not lower than 700° C. and not higher than 800° C.

The heat treatment time is not less than 30 min and not more than 300 min. When the heat treatment time is less than 30 min, diffusion of R tends to hardly sufficiently proceed, so that the effect of enhancing a coercive force of the magnet particles tends to be lowered. When the heat treatment time is more than 300 min, the effect of the heat treatment tends to be saturated, and crystal grains in the magnetic phase tend to become coarse, so that the resulting magnet particles tend to be deteriorated in coercive force. The heat treatment time is preferably not less than 45 min and not more than 180 min and more preferably not less than 60 min and not more than 120 min.

After completion of the heat treatment, the resulting magnet particles are cooled to obtain the R-T-B-based rare earth magnet particles according to the present invention. When the R-T-B-based rare earth magnet particles obtained after the heat treatment are rapidly cooled in an Ar atmosphere, it is possible to prevent formation of coarse crystal grains in the magnetic phase of the magnet particles as well as deterioration in coercive force of the magnet particles.

In the present invention, the heat treatment after completion of the HDDR treatment is conducted at a low temperature as compared to the treating temperature of the DR step. As a result, it is possible to enhance a coercive force of the resulting magnet particles and maintain a high residual magnetic flux density thereof without formation of coarse crystal grains in the magnet particles.

The effects of enhancing a coercive force of the magnet particles and maintaining a high residual magnetic flux density thereof by subjecting the Al-containing R-T-B-based rare earth magnet particles to the heat treatment after the HDDR treatment can be effectively exhibited in the case where the content of Al in the raw material alloy, i.e., the content of Al in the average composition of the R-T-B-based rare earth magnet particles is less than 1.5 atom %. When the content of Al is not less than 1.5 atom %, no enhancement of the coercive force of the magnet particles tends to be attained in the heat treatment since R is sufficiently diffused therein in the HDDR treatment. In such a case, the magnet particles by themselves tend to exhibit a low residual magnetic flux density. In the present invention, by conducting the heat treatment after the HDDR treatment, there can be attained the effect of enhancing coercive force of the magnet particles owing to diffusion of R in the grain boundary phase by Al which is merely insufficiently made only by the HDDR treatment. Therefore, a more excellent effect of enhancing a coercive force of the magnet particles can be attained with respect to the magnetic particles comprising Al but having a small Al content. In order to obtain the R-T-B-based rare earth magnet particles having a high coercive force and a high residual magnetic flux density, the content of Al in the magnet particles is preferably not less than 0.05 atom % and not more than 1.0 atom %, and more preferably not less than 0.07 atom % and not more than 0.8 atom %.

(Production of Bonded Magnet)

The R-T-B-based rare earth magnet particles according to the present invention can be used to produce a bonded magnet therefrom. The magnet particles are mixed and kneaded with a thermoplastic resin, a coupling material and a lubricating material, and then the resulting kneaded material is subjected to compression molding, injection molding or the like in a magnetic field to thereby produce a bonded magnet. Alternatively, the magnet particles may be mixed with a thermosetting resin such as an epoxy resin, and the resulting mixture may be subjected to pressure molding or the like and then to heat treatment to thereby produce a bonded magnet.

EXAMPLES

In the following, the present invention is described in more detail by Examples and Comparative Examples.

In analysis of the average composition of the R-T-B-based rare earth magnet particles and the composition of the raw material alloy as described in the present invention, B and Al were analyzed using an ICP emission spectrophotometer "iCAP6000" manufactured by Thermo Fisher Scientific K. K., whereas the elements other than B and Al were analyzed using a fluorescent X-ray analyzer "RIX2011" manufactured by Rigaku Corporation.

The composition of a grain boundary of the R-T-B-based rare earth magnet particles as described in the present invention was analyzed using an energy disperse type X-ray analyzer "JED-2300F" manufactured by JELL Ltd.

As magnetic properties of the R-T-B-based rare earth magnet particles according to the present invention, a coercive force ($H_{cj}$), a maximum energy product ($(BH)_{max}$) and a residual magnetic flux density ($B_r$) of the magnet particles were measured using a vibrating sample type magnetic flux meter (VSM: "VSM-5 Model") manufactured by Toei Kogyo K. K.

(Production of Raw Material Alloy Particles)

Alloy ingots A1 to A3 each having a composition shown in Table 1 below were produced. The thus produced alloy ingots were subjected to heat treatment in a vacuum atmosphere at 1150° C. for 20 hr to obtain a homogenized composition. After completion of the homogenization heat treatment, the resulting particles were subjected to coarse pulverization using a jaw crusher, and further to hydrogen absorption and then mechanical pulverization, thereby obtaining raw material alloy particles A1 to A3.

TABLE 1

| | Nd | Fe | Co | B | Al | Ga | Zr |
|---|---|---|---|---|---|---|---|
| A1 | 12.9 | Bal. | 5.3 | 6.2 | 0.07 | 0.5 | 0.1 |
| A2 | 12.9 | Bal. | 5.3 | 6.2 | 0.5 | 0.5 | 0.1 |
| A3 | 12.9 | Bal. | 5.3 | 6.2 | 1.5 | 0.5 | 0.1 |

Note
*Unit: atom %; Bal. means a balance.

Example 1

(HDDR Treatment: HD Step)

In the HD step, 5 kg of the raw material alloy particles A1 were charged into a furnace. Thereafter, the particles were heated to 840° C. in a mixed gas of hydrogen and Ar maintained under a total pressure of 100 kPa (atmospheric pressure) having a hydrogen partial pressure of 60 kPa and held therein for 200 min.

(HDDR Treatment: Preliminary Evacuation Step)

After completion of the HD step, the resulting particles were subjected to preliminary evacuation step in which an inside of the furnace was evacuated using a rotary pump until the vacuum degree inside of the furnace reached 3.2 kPa. By controlling a valve opening degree of the vacuum evacuation system, the vacuum degree inside of the furnace was held under 3.2 kPa at a temperature of 840° C. for 100 min to subject the particles to dehydrogenation.

(HDDR Treatment: Complete Evacuation Step)

After completion of the preliminary evacuation step, the resulting particles were further subjected to complete evacuation step in which the vacuum evacuation was further continued until the vacuum degree inside of the furnace was dropped from 3.2 kPa and finally reached not more than 1 Pa. The complete evacuation step was conducted at a treating temperature of 840° C. for a total treating time of 45 min. The resulting particles were cooled to obtain R-T-B-based rare earth magnet particles. The thus obtained R-T-B-based rare earth magnet particles were measured for their magnetic properties.

(Heat Treatment)

The heat treatment was conducted as follows. That is, the particles obtained after the HDDR treatment were charged into a furnace and heated to 700° C. in an Ar atmosphere. The particles were allowed to stand at 700° C. for 1 hr and then rapidly cooled in an Ar atmosphere to obtain R-T-B-based rare earth magnet particles. The thus obtained R-T-B-based rare earth magnet particles were measured for their composition and magnetic properties.

Example 2

The same procedure as in Example 1 was conducted except that the heat treatment temperature was changed to 750° C., thereby obtaining R-T-B-based rare earth magnet particles.

Example 3

The same procedure as in Example 1 was conducted except that the heat treatment temperature was changed to 800° C., thereby obtaining R-T-B-based rare earth magnet particles.

Example 4

The same procedure as in Example 2 was conducted except that the heat treatment time was changed to 2 hr, thereby obtaining R-T-B-based rare earth magnet particles.

Example 5

The same procedure as in Example 1 was conducted except that the raw material alloy A2 was used instead, thereby obtaining R-T-B-based rare earth magnet particles.

Example 6

The same procedure as in Example 2 was conducted except that the raw material alloy A2 was used instead, thereby obtaining R-T-B-based rare earth magnet particles.

Example 7

The same procedure as in Example 3 was conducted except that the raw material alloy A2 was used instead, thereby obtaining R-T-B-based rare earth magnet particles.

Example 8

The same procedure as in Example 7 was conducted except that the heat treatment time was changed to 3 hr, thereby obtaining R-T-B-based rare earth magnet particles.

Comparative Example 1

The same procedure as in Example 1 was conducted except that the raw material alloy A3 was used instead, thereby obtaining R-T-B-based rare earth magnet particles.

Comparative Example 2

The same procedure as in Example 2 was conducted except that the raw material alloy A3 was used instead, thereby obtaining R-T-B-based rare earth magnet particles.

Comparative Example 3

The same procedure as in Example 3 was conducted except that the raw material alloy A3 was used instead, thereby obtaining R-T-B-based rare earth magnet particles.

TABLE 2

| Examples and Comparative Examples | Alloy used Kind | Heat treatment conditions Temp. ° C. | Heat treatment conditions Time hr | Average composition of magnet particles Al content atom % | Average composition of magnet particles Nd content atom % |
|---|---|---|---|---|---|
| Example 1 | A1 | 700 | 1.0 | 0.07 | 12.9 |
| Example 2 | A1 | 750 | 1.0 | 0.07 | 12.9 |
| Example 3 | A1 | 800 | 1.0 | 0.07 | 12.9 |
| Example 4 | A1 | 750 | 2.0 | 0.07 | 12.9 |
| Example 5 | A2 | 700 | 1.0 | 0.50 | 12.9 |
| Example 6 | A2 | 750 | 1.0 | 0.50 | 12.9 |
| Example 7 | A2 | 800 | 1.0 | 0.50 | 12.9 |
| Example 8 | A2 | 800 | 3.0 | 0.50 | 12.9 |
| Comparative Example 1 | A3 | 700 | 1.0 | 1.50 | 12.9 |
| Comparative Example 2 | A3 | 750 | 1.0 | 1.50 | 12.9 |
| Comparative Example 3 | A3 | 800 | 1.0 | 1.50 | 12.9 |

| Examples and Comparative Examples | Composition of grain boundary of magnet particles Al content atom % | Composition of grain boundary of magnet particles Nd content atom % | Magnetic properties before heat treatment $H_{cj}$ kA/m | Magnetic properties before heat treatment $(BH)_{max}$ kJ/m$^3$ | Magnetic properties before heat treatment Br T |
|---|---|---|---|---|---|
| Example 1 | 0.08 | 21.2 | 1200 | 284 | 1.26 |
| Example 2 | 0.08 | 21.4 | 1200 | 284 | 1.26 |
| Example 3 | 0.09 | 21.5 | 1200 | 284 | 1.26 |
| Example 4 | 0.08 | 21.3 | 1200 | 284 | 1.26 |
| Example 5 | 0.70 | 23.8 | 1260 | 278 | 1.25 |
| Example 6 | 0.72 | 24.0 | 1260 | 278 | 1.25 |
| Example 7 | 0.73 | 24.1 | 1260 | 278 | 1.25 |
| Example 8 | 0.72 | 24.0 | 1260 | 278 | 1.25 |
| Comparative Example 1 | 1.66 | 23.5 | 1320 | 269 | 1.19 |
| Comparative Example 2 | 1.68 | 23.7 | 1320 | 269 | 1.19 |
| Comparative Example 3 | 1.68 | 23.7 | 1320 | 269 | 1.19 |

| Examples and Comparative Examples | Magnetic properties after heat treatment $H_{cj}$ kA/m | Magnetic properties after heat treatment $(BH)_{max}$ kJ/m$^3$ | Magnetic properties after heat treatment Br T |
|---|---|---|---|
| Example 1 | 1300 | 289 | 1.26 |
| Example 2 | 1320 | 291 | 1.27 |
| Example 3 | 1290 | 289 | 1.27 |
| Example 4 | 1310 | 288 | 1.26 |
| Example 5 | 1300 | 279 | 1.25 |
| Example 6 | 1310 | 280 | 1.25 |
| Example 7 | 1300 | 279 | 1.25 |
| Example 8 | 1310 | 275 | 1.25 |
| Comparative Example 1 | 1280 | 261 | 1.19 |
| Comparative Example 2 | 1300 | 262 | 1.19 |
| Comparative Example 3 | 1320 | 269 | 1.19 |

(Results)

As shown in Table 2, the magnet particles obtained in Examples 1 to 8 had a coercive of not less than 1290 kA/m and a residual magnetic flux density of not less than 1.25 T. The reason therefor is considered to be that the Nd-rich phase was diffused in the grain boundary by the heat treatment, so that the thickness of the Nd-rich phase in the grain boundary was increased as compared to that before the heat treatment.

On the other hand, in Comparative Examples 1 to 3, the magnet particles obtained even after the heat treatment failed to be enhanced in coercive force. The reason therefor is considered to be that since the amount of Al added to the raw material alloy was large, the R-rich phase was sufficiently diffused during the HDDR treatment and therefore the effect of the heat treatment was no longer exhibited, so that no enhancement of a coercive force of the magnet particles was observed. In addition, the magnet particles obtained in the respective Comparative Examples had a low residual magnetic flux density due to a large content of Al therein as compared to those particles obtained in the Example.

In the process for producing R-T-B-based rare earth magnet particles according to the present invention, by suppressing an amount of elements added for enhancing a coercive force of the magnet particles, it is possible to diffuse an R-rich phase in a grain boundary thereof by subjecting the magnet particles to heat treatment without deterioration in residual magnetic flux density of the magnet particles. As a result, it is possible to obtain R-T-B-based rare earth magnet particles having excellent residual magnetic flux density and coercive force.

What is claimed is:

1. A process for producing R-T-B-based rare earth magnet particles, comprising steps of:

subjecting a raw material alloy comprising:

R, wherein R represents at least one rare earth element including Y,

T, wherein T represents Fe, or Fe and Co,

B, wherein B represents boron, and

Al, wherein Al represents aluminum, to HDDR treatment to obtain Al-containing R-T-B-based rare earth magnet particles having an Al content of more than 0 atom % and not more than 1.0 atom %; and heat-treating the Al-containing R-T-B-based rare earth magnet particles in vacuum or in an Ar atmosphere at a temperature of not lower than 670° C. and not higher than 820° C. for a period of not less than 30 min and not more than 300 min, wherein the R-T-B-based rare earth magnet particles do not comprise Nb, wherein the R-T-B-based rare earth magnet particles have a coercive force of not less than 1290 kA/m, and wherein the R-T-B-based rare earth magnet particles have a residual magnetic flux density of not less than 1.25 T.

2. The process for producing R-T-B-based rare earth magnet particles according to claim 1, wherein the raw material alloy has a composition comprising R in an amount of not less than 12.5 atom % and not more than 14.3 atom %, and B in an amount of not less than 4.5 atom % and not more than 7.5 atom %.

3. The process for producing R-T-B-based rare earth magnet particles according to claim 1, wherein the raw material alloy comprises Ga and Zr, and has a composition comprising Co in an amount of not more than 10.0 atom %, Ga in an amount of not less than 0.1 atom % and not more than 1.0 atom % and Zr in an amount of not less than 0.05 atom % and not more than 0.15 atom %.

4. The process for producing R-T-B-based rare earth magnet particles according to claim 1, wherein R represents at least one rare earth element selected from the group consisting of Y, La, Ce, Pr, Nd, Pm, Sm, Eu, Gd, Tb, Ho, Er, Tm, Yb and Lu.

5. The process for producing R-T-B-based rare earth magnet particles according to claim 1, wherein the R-T-B-based rare earth magnet particles do not comprise Dy.

* * * * *